(12) United States Patent
Fujiwara et al.

(10) Patent No.: US 8,774,575 B2
(45) Date of Patent: Jul. 8, 2014

(54) OPTICAL WAVEGUIDE AND OPTICAL WAVEGUIDE MANUFACTURING MEMBER

(75) Inventors: Makoto Fujiwara, Utsunomiya (JP); Kenji Miyao, Yokohama (JP); Yoji Shirato, Yaizu (JP); Koji Choki, Kawasaki (JP); Mutsuhiro Matsuyama, Brecksville, OH (US)

(73) Assignee: Sumitomo Bakelite Company Limited, Tokyo (JP)

( * ) Notice: Subject to any disclaimer, the term of this patent is extended or adjusted under 35 U.S.C. 154(b) by 332 days.

(21) Appl. No.: 13/132,735

(22) PCT Filed: Dec. 1, 2009

(86) PCT No.: PCT/JP2009/070187
§ 371 (c)(1),
(2), (4) Date: Jun. 3, 2011

(87) PCT Pub. No.: WO2010/064635
PCT Pub. Date: Jun. 10, 2010

(65) Prior Publication Data
US 2011/0243499 A1    Oct. 6, 2011

(30) Foreign Application Priority Data
Dec. 4, 2008    (JP) .................................. 2008-310203

(51) Int. Cl.
*G02B 6/26* (2006.01)
(52) U.S. Cl.
USPC .......................................................... 385/31
(58) Field of Classification Search
None
See application file for complete search history.

(56) References Cited

U.S. PATENT DOCUMENTS

| 5,135,605 A * | 8/1992 | Blonder et al. ................ 216/47 |
| 2005/0074207 A1 | 4/2005 | Shioda et al. |
| 2008/0175531 A1* | 7/2008 | Fincato et al. .................. 385/14 |
| 2010/0150506 A1* | 6/2010 | Maeda et al. ................. 385/123 |

FOREIGN PATENT DOCUMENTS

| JP | 4 264409 | 9/1992 |
| JP | 2001 272565 | 10/2001 |
| JP | 2002-245659 A | 8/2002 |
| JP | 2005 134493 | 5/2005 |
| JP | 2005 284248 | 10/2005 |
| JP | 2006 330119 | 12/2006 |

OTHER PUBLICATIONS

International Search Report Issued Dec. 28, 2009 in PCT/JP09/070187 filed Dec. 1, 2009.

(Continued)

*Primary Examiner* — Sung Pak
(74) *Attorney, Agent, or Firm* — Oblon, Spivak, McClelland, Maier & Neustadt, L.L.P.

(57) ABSTRACT

An optical waveguide includes a clad layer, a core layer and a clad layer which are laminated together in this order from a lower side thereof. Within the core layer, a core portion and a side clad portion provided adjacent to the core portion so as to surround side surfaces of the core portion are formed. Further, a part of the side clad portion prevents a left side end of the core portion from being exposed outside. A mirror formation region is constituted from a region consisting of such a part of the side clad portion and a part of each of the clad layers located thereabove and therebelow. This mirror formation region is subjected to digging processing so that a concave portion is formed. An inner surface of this concave portion serves as the mirror. From the mirror, a material other than a material constituting the core portion, that is, a material constituting each of the clad layers and a material constituting the side clad portion are exposed.

20 Claims, 12 Drawing Sheets

(56) References Cited

OTHER PUBLICATIONS

Office Action issued on May 14, 2013, in Japanese patent Application No. 2010-541326.

Office Action issued Apr. 2, 2014, in Taiwanese Patent Application No. 098141483, filed Dec. 4, 2009.

\* cited by examiner

OPTICAL WAVEGUIDE AND OPTICAL WAVEGUIDE MANUFACTURING MEMBER

TECHNICAL FIELD

The present invention relates to an optical waveguide and an optical waveguide manufacturing member.

RELATED ART

Recently, optical communications in which data is transferred by using optical carrier waves are becoming increasingly important. In such optical communications, an optical waveguide is used as one means for conducting or guiding the optical carrier waves from one point to another point.

For example, the optical waveguide includes core portions each having an elongated shape and clad portions provided so as to surround the core portions. The core portions are formed of substantially a transparent material for light to be used as the optical carrier waves. The clad portions are formed of a material having a refractive index lower than that of the core portions.

Such an optical waveguide is, generally, provided on a surface of a wiring board. Further, a light emitting element and a light receiving element are also provided on the wiring board. Light signal emitted from the light emitting element is propagated through the optical waveguide and received by the light receiving element.

Meanwhile, recently, in order to make the wiring board thinner and to manufacture the wiring board at a low cost, a surface mounting type element is often used as the light emitting element or the light receiving element.

The surface mounting type light emitting element is commonly a type of element which emits light to be propagated in a direction perpendicular to the wiring board. Therefore, in order to conduct the light emitted from the light emitting element into the optical waveguide provided along the wiring board, an optical path of the light have to be changed at 90°.

On the other hand, the surface mounting type light receiving element is also commonly a type of element which receives light to be propagated in a direction perpendicular to the wiring board. Therefore, in order to conduct the light passed through the optical waveguide to the light receiving element, the optical path of the light has to be changed at 90° again.

Upon such a requirement, conventionally, proposed is an optical waveguide in which an opening is formed in a middle thereof so as to traverse (pass through) a core at an angle by radiation of laser and a wall surface of the opening inclined at 45° to an optical waveguide surface is used as a micro mirror (see Patent document 1).

Namely, the optical waveguide disclosed in the Patent document 1 has the opening formed so as to traverse (penetrate) the core and a part of a clad by laser processing, and a cut surface of the core and clad exposed from the wall surface of the opening is used as the micro mirror.

Recently, from the viewpoint of improved quality in the optical communications, it is required that profile irregularity of the micro mirror is further improved.

The Patent Document 1 is Japanese Patent Application Laid-open No. 2005-284248.

SUMMARY OF THE INVENTION

It is an object of the present invention to provide an optical waveguide that is provided with a mirror having high optical performance and can carry out optical communications in high quality, and to provide an optical waveguide manufacturing member that is used for manufacturing such an optical waveguide and provided with a mirror formation region within which a mirror having high optical performance can be easily formed.

Further, in the case where the mirror is formed by laser processing, it is possible to substantially uniform a processing rate in processing a processing surface of the mirror, to thereby further improve profile irregularity of the mirror.

In order to achieve the above object, the present invention is related to an optical waveguide comprising:

a core portion having an elongated shape;

a clad portion provided so as to adjoin the core portion; and a mirror consisting of a processing surface traversing an extension line of a light axis of the core portion at an angle, wherein only a material other than a material constituting the core portion is exposed from the processing surface.

Since the present invention has a mirror consisting of a processing surface, from which a material capable of being uniformly processed at high accuracy is exposed, it is possible to provide an optical waveguide provided with a mirror having superior profile irregularity and optical performance.

Further, a material constituting a clad portion has generally high degree of freedom in selection of material and higher heat resistance than that of a material (or chemical structure) constituting a core portion. Therefore, in the case where the material constituting the clad portion is exposed from the processing surface of the mirror, it is possible to improve heat resistance of the mirror. As a result, it is possible to provide an optical waveguide having sufficient heat resistance against a heat treatment such as solder reflow.

Further, in the optical waveguide according to the present invention, it is preferred that only a material constituting at least a part of the clad portion is exposed from the processing surface.

In order to achieve the above object, the present invention is also related to an optical waveguide comprising:

a core layer including a core portion having an elongated shape and side surfaces, and a side clad portion provided so as to adjoin the side surfaces of the core portion;

two clad layers laminated on the core layer so that the core layer is put between the two clad layers; and a mirror consisting of a processing surface traversing an extension line of a light axis of the core portion at an angle, wherein only a material constituting the side clad portion is exposed from an area of the processing surface corresponding to the core layer.

Further, in the optical waveguide according to the present invention, it is preferred that only the material constituting the side clad portion and a material constituting the two clad layers are exposed from the processing surface.

Further, in the optical waveguide according to the present invention, it is preferred that the material constituting the side clad portion is identical with the material constituting the two clad layers.

Further, in the optical waveguide according to the present invention, it is preferred that the core portion has two ends, and a distance from the mirror to the end of the core portion existing at a side of the mirror on the extension line of the light axis of the core portion is in the range of 5 to 250 μm.

Further, in the optical waveguide according to the present invention, it is preferred that the processing surface is processed by laser processing.

Further, in the optical waveguide according to the present invention, it is preferred that the core portion is formed of a norbornene-based polymer as a main component thereof.

In order to achieve the above object, the present invention is related to an optical waveguide manufacturing member to be used for manufacturing an optical waveguide, comprising:

a core portion having an elongated shape;

a clad portion provided so as to adjoin the core portion; and a mirror formation region to be subjected to processing for forming a mirror, wherein the mirror formation region is provided on an extension line of the core portion and formed of only a material other than a material constituting the core portion.

Since the present invention can have a mirror consisting of a processing surface, from which a material capable of being uniformly processed at high accuracy is exposed, it is possible to provide an optical waveguide manufacturing member that can be easily processed into an optical waveguide provided with a mirror having superior profile irregularity and optical performance.

Further, in the optical waveguide manufacturing member according to the present invention, it is preferred that the mirror formation region is formed of only a material constituting at least a part of the clad portion.

In order to achieve the above object, the present invention is also related to an optical waveguide manufacturing member to be used for manufacturing an optical waveguide, comprising:

a core layer including a core portion having an elongated shape and side surfaces, and a side clad portion provided so as to adjoin the side surfaces of the core portion;

two clad layers laminated on the core layer so that the core layer is put between the two clad layers; and a mirror formation region to be subjected to processing for forming a mirror, wherein the mirror formation region is provided on an extension line of the core portion, and an area of the mirror formation region corresponding to the core layer is formed of only a material constituting the side clad portion.

Further, in the optical waveguide manufacturing member according to the present invention, it is preferred that the mirror formation region is formed of only the material constituting the side clad portion and a material constituting the two clad layers.

Further, in the optical waveguide manufacturing member according to the present invention, it is preferred that the processing for forming the mirror is processing by which a part of the mirror formation region is removed.

BEST MODE FOR CARRYING OUT THE INVENTION

Hereinafter, an optical waveguide and an optical waveguide manufacturing member according to the present invention will be described in detail based on a certain preferred embodiment shown in the accompanying drawings.

Figure 1:
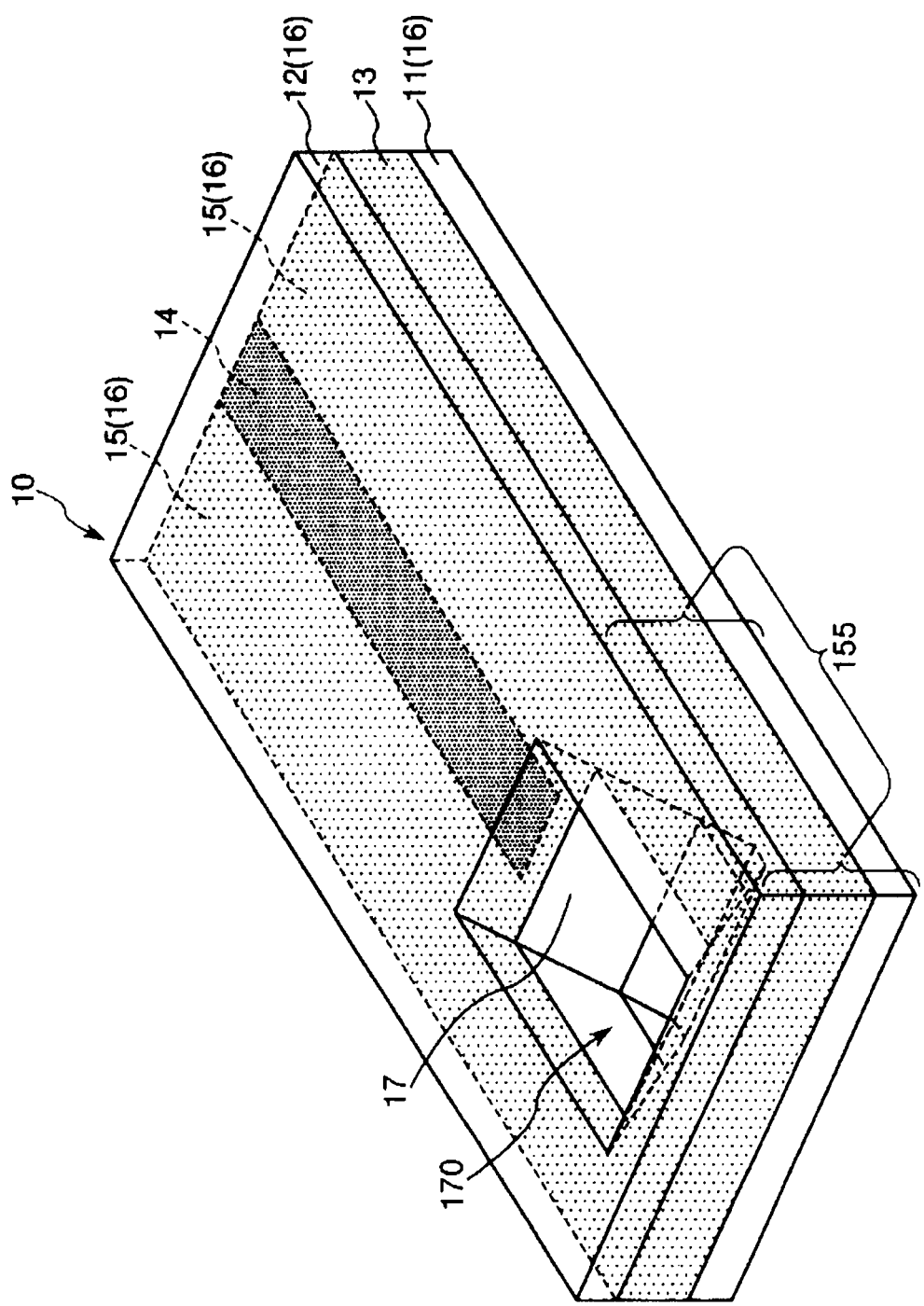
FIG. 1 is a perspective view showing an embodiment of an optical waveguide of the present invention (a part thereof is transparentized).
Figure 2:
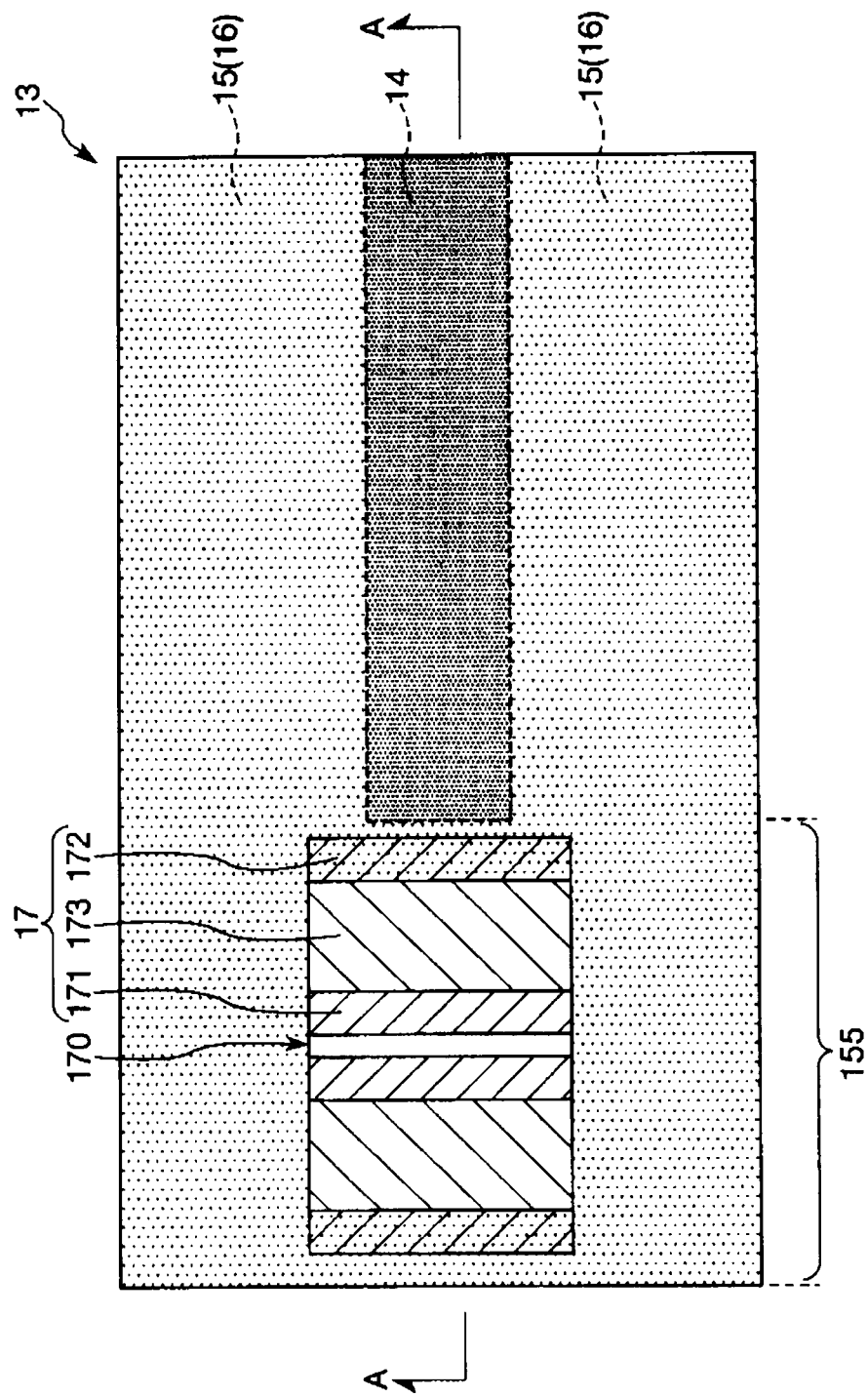
FIG. 2 is a top view showing the optical waveguide shown in FIG. 1.
Figure 3:
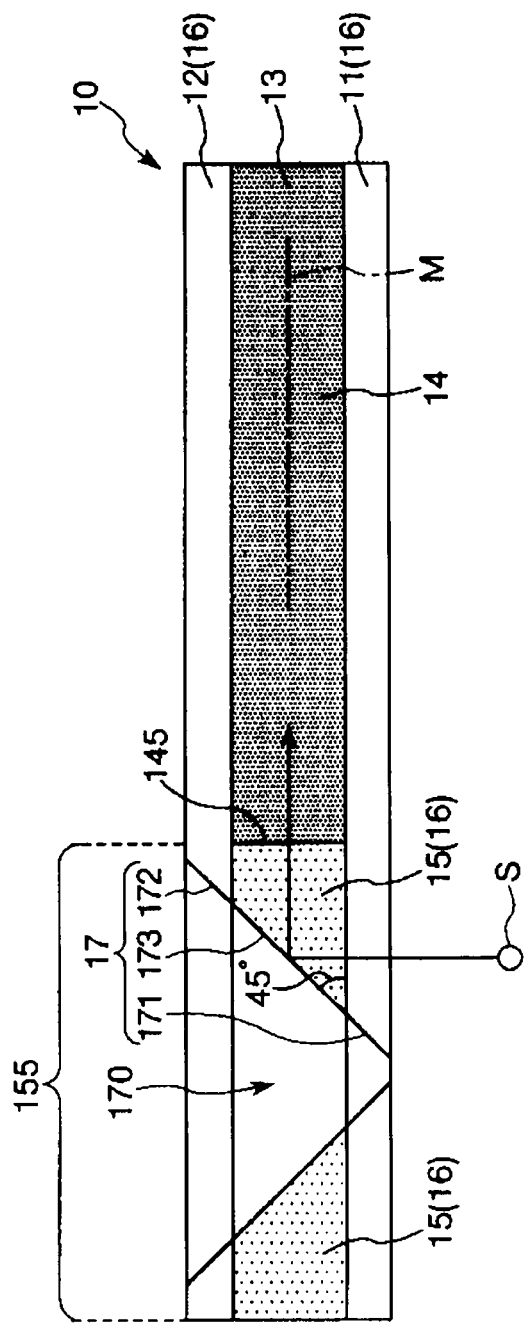
FIG. 3 is a section view showing the optical waveguide shown in FIG. 2 taken along the line A-A.

FIG. 1 is a perspective view showing an embodiment of the optical waveguide of the present invention (a part thereof is transparentized), FIG. 2 is a top view showing the optical waveguide shown in FIG. 1, and FIG. 3 is a section view showing the optical waveguide shown in FIG. 2 taken along the line A-A.

In the following description, the upper side in FIGS. 1 and 3 will be referred to as "upper" and the lower side thereof will be referred to as "lower".

An optical waveguide 10 shown in FIG. 1 includes a clad layer 11, a core layer 13 and a clad layer 12 which are laminated together in this order from the lower side of FIG. 1.

Further, in the vicinity of one of ends of the optical waveguide 10, a mirror formation region 155, within which a mirror 17 is formed, is provided. In this embodiment, the mirror formation region 155 is constituted from a laminated body in which a part of the clad layer 11, a part of a side clad portion 15 and a part of the clad layer 12 are laminated together.

Hereinafter, the core layer 13 and each of the clad layers 11 and 12 will be described in detail.

Within the core layer 13, a core portion 14 having an elongated shape and the side clad portion 15 provided adjacent to the core portion 14 so as to surround side surfaces and one of ends of the core portion 14 are formed. Namely, the core portion 14 is surrounded by a clad portion 16 consisting of the clad layer 11 located therebelow, the clad layer 12 located thereabove and the side clad portion 15 located lateral thereto.

In this regard, in each of FIGS. 1 to 3, dots are added to only the core layer 13. Specifically, relatively dense dots are added to the core portion 14 and relatively nondense dots are added to the side clad portion 15. Further, in each of FIGS. 1 and 2, the clad layer 12 is shown with being transparentized.

In order to be totally reflected at an interfacial surface between the core portion 14 and the clad portion 16, a refractive index difference at the interfacial surface have need to exist. A refractive index of the core portion 14 is higher than that of the clad portion 16. The refractive index difference therebetween is not limited to a specific value, but is preferably 0.5% or more, and more preferably 0.8% or more.

An upper limit value of the refractive index difference may be not set to a specific value, but is preferably about 5.5%. If the refractive index difference is smaller than the lower limit value noted above, there is a case that a light propagation effect is reduced. On the other hand, even if the refractive index difference exceeds the upper limit value, the light propagation effect can no longer be expected to further increase.

In this regard, in the case where the refractive index of the core portions 14 is defined as "A" and the refractive index of the clad portion 16 is defined as "B", the refractive index difference is represented by the following equation:

Refractive Index Difference (%)=|A/B−1|×100.

Further, in the structure shown in FIG. 1, the core portion 14 is formed so as to have a linear shape in a planar view thereof. However, the core portion 14 may have an arbitrary shape such a shape provided with curved portions in a middle thereof or a shape provided with forked portions in a middle thereof.

Further, a cross-sectional shape of the core portion 14 has a quadrangular shape such as a square shape or a rectangle shape.

Each of width and height of the core portion is not limited to a specific value, but is preferably in the range of about 1 to 200 μm, more preferably in the range of about 5 to 100 μm, and even more preferably in the range of about 10 to 60 μm.

A constituent material of each of the core portion 14 and the clad portion 16 is not limited to a specific type as long as it can generate the refractive index difference set forth above.

Specifically, examples of the constituent material include: various kinds of resin materials such as an acryl-based resin, a methacryl-based resin, polycarbonate, polystyrene, an epoxy resin, polyamide, polyimide, polybenzoxazole, polysilane, polysilazane and a cyclic olefin-based resin (e.g., a benzo cyclobutene-based resin or a norbornene-based resin); a glass material such as quartz glass and borosilicic acid glass; and the like.

In this embodiment, in the core layer 13, the core portion 14 and the side clad portion 15 are made of the same base material (base component) as each other. The refractive index difference between the core portion 14 and the side clad portion 15 is developed by a difference between chemical structures of the respective constituent materials thereof.

In order to develop the refractive index difference due to the difference between the chemical structures, it is preferred that a material whose refractive index is changed by being irradiated with an activated energy ray such as an ultraviolet ray or an electron ray (or by being additionally heated) is used as each of the constituent materials of the core portion 14 and side clad portion 15.

Examples of such a material whose refractive index is changed include a material whose chemical structure can be changed by breaking at least a part of bonds or removing at least a part of functional groups by being irradiated with the activated energy ray or heated.

Specifically, examples of the material whose refractive index is changed include: a silane-based resin such as polysilane (e.g., polymethyl phenyl silane) and polysilazane (e.g., perhydropolysilazane); and the following resins (1) to (6) having functional groups in side chains or terminals of molecules. (1) an addition-type (co)polymer obtained by addition (co)polymerization reaction between a norbornene-based monomer, (2) an addition-type copolymer obtained by addition copolymerization reaction between the norbornene-based monomer and ethylene or α-olefin, (3) an addition-type copolymer obtained by addition copolymerization reaction among the norbornene-based monomer, non-conjugated diene, and if needed, other monomers, (4) a ring opening-type norbornene-based (co)polymer and a (co)polymer obtained by hydrogenating, if needed, the ring opening-type norbornene-based (co)polymer, (5) a ring opening-type norbornene-based copolymer obtained by ring opening copolymerization reaction between the norbornene-based monomer and the ethylene or α-olefin and a copolymer obtained by hydrogenating, if needed, the ring opening-type norbornene-based copolymer, and (6) a ring opening-type norbornene-based copolymer obtained by ring opening copolymerization reaction between the norbornene-based monomer and the non-conjugated diene or other monomers and an norbornene-based copolymer obtained by hydrogenating, if needed, the ring opening-type norbornene-based copolymer, in addition to that, an acryl-based resin obtained by porimerizing a potocrosslinkable-reactive monomer and an epoxy resin.

Among them, the norbornene-based resin (polymer) is preferred. The norbornene-based polymer can be obtained by using various kinds of well known polymerizations such as ring opening metathesis polymerization (ROMP), a combination of ROMP and hydrogenation, polymerization via radicals or cations, polymerization using a cationic palladium polymerization initiator and polymerization using other polymerization initiator than them (e.g., a nickel polymerization initiator or another transition metal polymerization initiator).

On the other hand, the clad layers 11 and 12 make up the clad portions positioned below and above the core portion 14. This configuration allows the core portion 14 to serve as a waveguide whose outer periphery is surrounded by the clad portion 16.

An average thickness of each of the clad layers 11 and 12 is preferably in the range of about 0.1 to 1.5 times with respect to an average thickness of the core layer 13 (an average height of the core portion 14), and more preferably in the range of about 0.2 to 1.25 times with respect to the average thickness of the core layer 13.

Specifically, the average thickness of each of the clad layers 11 and 12 is not limited to a specific value, but, in general, is preferably in the range of about 1 to 200 μm, more preferably in the range of about 5 to 100 μm, and even more preferably in the range of about 10 to 60 μm. This enables the clad layers to reliably exhibit their function while preventing the optical waveguide 10 from being unnecessarily increased in a size (thickness).

Further, as a constituent material of each of the clad layers 11 and 12, it is possible to use, for example, the same material as the constituent material of the core layer 13 described above. In particular, the norbornene-based polymer is preferred.

In this regard, in this embodiment, it is possible to appropriately select different materials in light of the refractive index difference between the core layer 13 and the clad layers 11 and 12, and to use them as the constituent material of the core layer 13 and the constituent material of the clad layers 11 and 12.

It is desirable if the materials thus selected are capable of generating the refractive index difference great enough to totally reflect light in boundaries between the core layer 13 and clad layers 11 and 12. This makes it possible to obtain a great enough refractive index difference in a thickness direction of the optical waveguide 10, thereby restraining light from being leaked from the core portion 14 to the clad layers 11 and 12. As a consequence, it is possible to suppress attenuation of light propagating through the core portion 14.

Further, from the viewpoint of the suppression of light attenuation, it is preferable to enhance adhesions between the core layer 13 and the clad layers 11 and 12. Therefore, the constituent material of each of the clad layers 11 and 12 may be any material as long as it has a refractive index smaller than that of the constituent material of the core layer 13 and provides enhanced adhesion with respect to the constituent material of the core layer 13.

For example, as a norbornene-based polymer having a relatively low refractive index, one including norbornene repeating units and substituent groups each containing an epoxy structure at ends thereof is preferred. Such a norbornene-based polymer has an especially low refractive index and exhibits great adhesion.

Further, a norbornene-based polymer including alkyl norbornene repeating units is also preferred. Since the norbornene-based polymer including alkyl norbornene repeating units has high plasticity, use of such a norbornene-based polymer makes it possible to impart high flexibility to the optical waveguide 10.

Examples of an alkyl group included in the alkyl norbornene repeating unit include a propyl group, a butyl group, a pentyl group, a hexyl group, a heptyl group, an octyl group, a nonyl group, a decyl group and the like. Among them, the hexyl group is especially preferred. In this regard, it is to be noted that these alkyl groups may be either a linear type or a branched type.

The inclusion of the hexyl norbornene repeating units makes it possible to prevent the refractive index of the norbornene-based polymer in total from being increased. Further, since such a norbornene-based polymer including hexyl norbornene repeating units has excellent permeability for light having a specific wavelength region (especially, near 850 nm), it is preferred.

The use of such an optical waveguide 10 according to the present invention is not limited in a specific field, but is preferably in, for example, data communications which use light having a wavelength range of about 600 to 1,550 nm, although it is slightly different depending on optical performance of the constituent material of the core portion 14 or the like.

Here, in this embodiment, the mirror formation region 155 is set in the vicinity of the one end of the laminated body in which the clad layer 11, the core layer 13 and the clad layer 12 are laminated together as described above. In other words, as shown in FIG. 2, one of ends of the optical waveguide 10 is occupied by the mirror formation region 155, and thus this mirror formation region 155 prevents the core portion 14 from being exposed outside.

Within the mirror formation region 155, the mirror 17 is provided. The mirror 17 is constituted from a part of a side surface (processing surface) of a concave portion 170 having a V-shape which is formed so that a part of the concave portion 170 is passed through the mirror formation region 155 in a thickness direction thereof.

This side surface is of a planar shape and is inclined at 45° to an axis line M of the core portion 14. Namely, the mirror 17 is formed so as to traverse (pass through) an extension line of the axis line M of the core portion 14 at an angle of 45°.

In this regard, in the case where the mirror formation region 155 is viewed from a side of a light emitting element S, width and length thereof are set so as to include width and length of the concave portion 170. This makes it possible for the mirror formation region 155 to expose from the entirety of the mirror 17, to thereby achieve the object of the present invention reliably.

Further, in this embodiment, among two side surfaces of the concave portion 170, only one of the side surfaces (which is adjacent to the core portion 14) functions as the mirror 17. Therefore, the other side surface may be omitted.

In such an optical waveguide 10, as shown by the arrow in FIG. 3, light emitted from the light emitting element S provided below the optical waveguide can be reflected by the mirror 17, and then conducted or guided into the core portion 14. Namely, an optical path of the emitted light is changed at 90° by the mirror 17.

The light conducted or guided into the core portion 14 repeats total reflection at the interfacial surface between the core portion 14 and the clad portion 16, thereby being propagated toward an outgoing side of the optical waveguide 10. Thereafter, the light is received by a light receiving element (not shown in the drawings) provided at the outgoing side of the optical waveguide 10. This makes it possible to perform optical communications based on glimmering patterns of the light. In this regard, the core portion 14 also can propagate light in an opposite direction to the above mentioned direction.

Meanwhile, the mirror formation region 155 is exposed from the mirror 17 shown in FIG. 1. More specifically, an exposed surface 171 formed of the material constituting the clad layer 11, an exposed surface 173 formed of the material constituting the side clad portion 15 and an exposed surface 172 formed of the material constituting the clad layer 12 are arranged in this order from the side of the light emitting element S (see FIGS. 2 and 3).

From each of the exposed surfaces 171, 173 and 172, only a material other than the material constituting the core portion 14 (core material), that is, only the material constituting the clad portion 16 (clad material) is exposed. This material makes contact with an external atmosphere (air) to generate a refractive index difference at a contact boundary surface therebetween. Therefore, the mirror 17 can reflect light based on the generated refractive index difference.

Further, in the case where light is emitted toward the mirror 17, the light to be emitted from the light emitting element S such as a semiconductor laser or a light emitting diode has generally a conular pattern in which the light is evenly spread around an optical axis thereof.

This makes it possible for the exposed surface 173 located at a central part of the mirror 17 in a thickness direction thereof to be irradiated with light having strongest light intensity. Therefore, optical performance of the mirror 17 is considered to be significantly dependent on profile irregularity of the exposed surface 173.

Here, a description will be made on a conventional optical waveguide.

Figure 11:
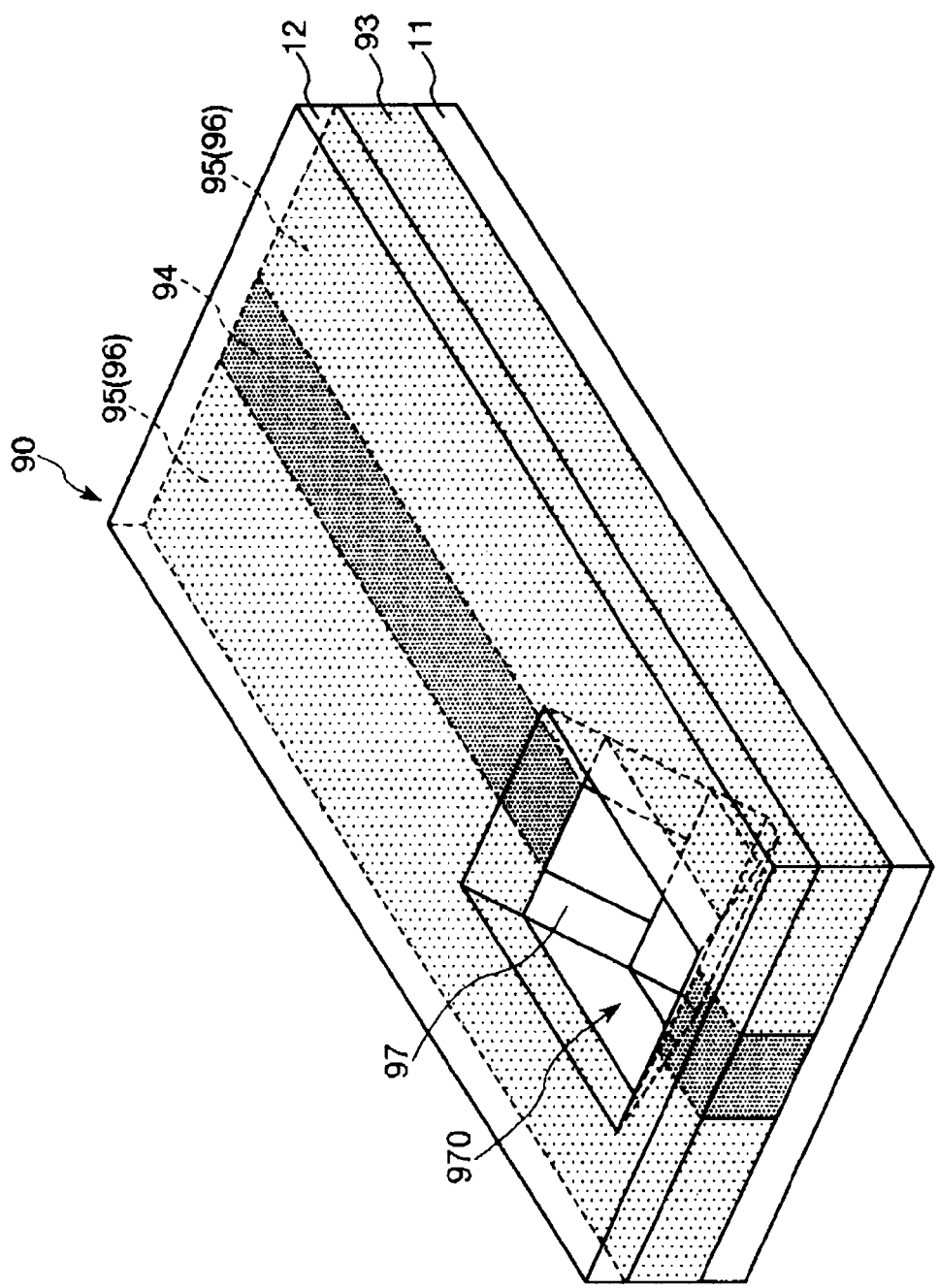
FIG. 11 is a perspective view showing a conventional optical waveguide (a part thereof is transparentized).
Figure 12:
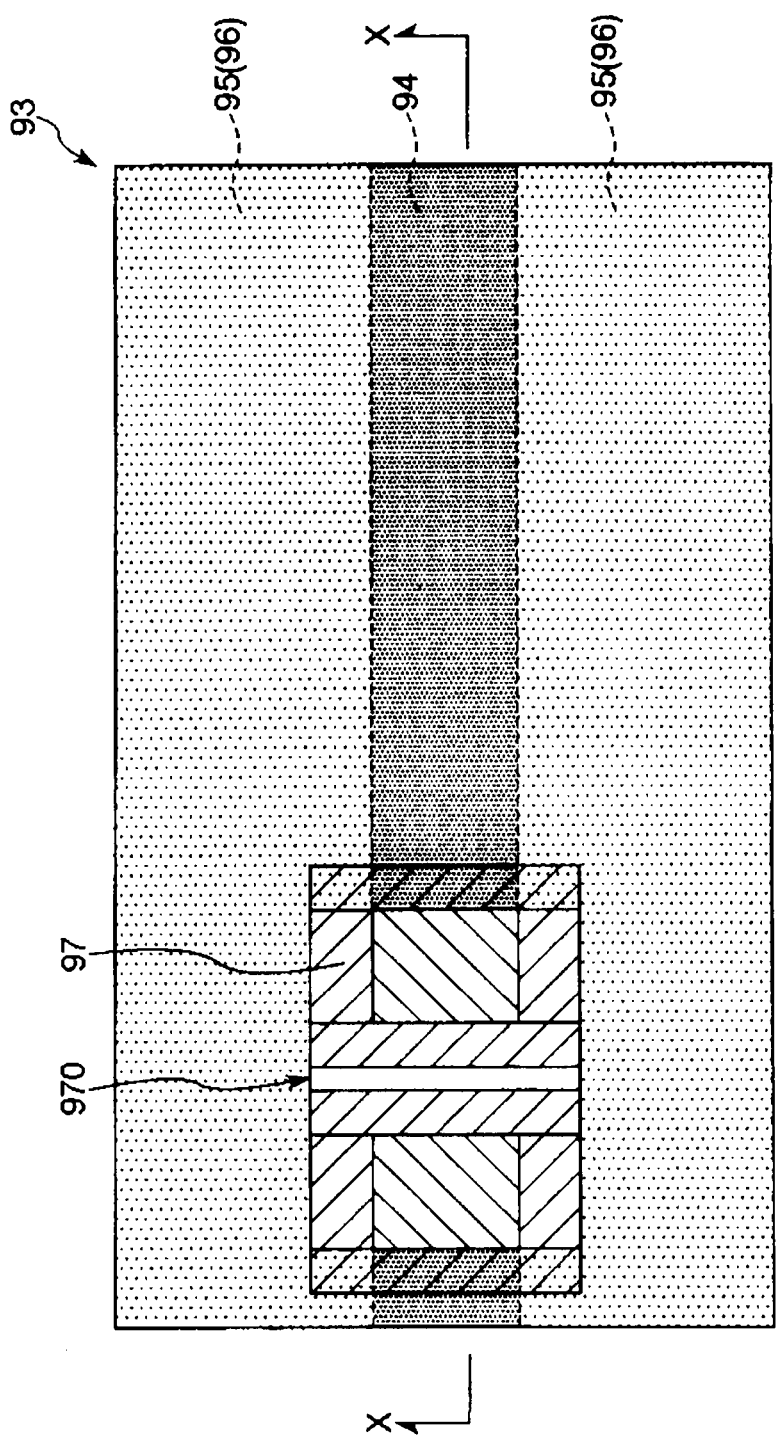
FIG. 12 is a top view showing the optical waveguide shown in FIG. 11.
Figure 13:
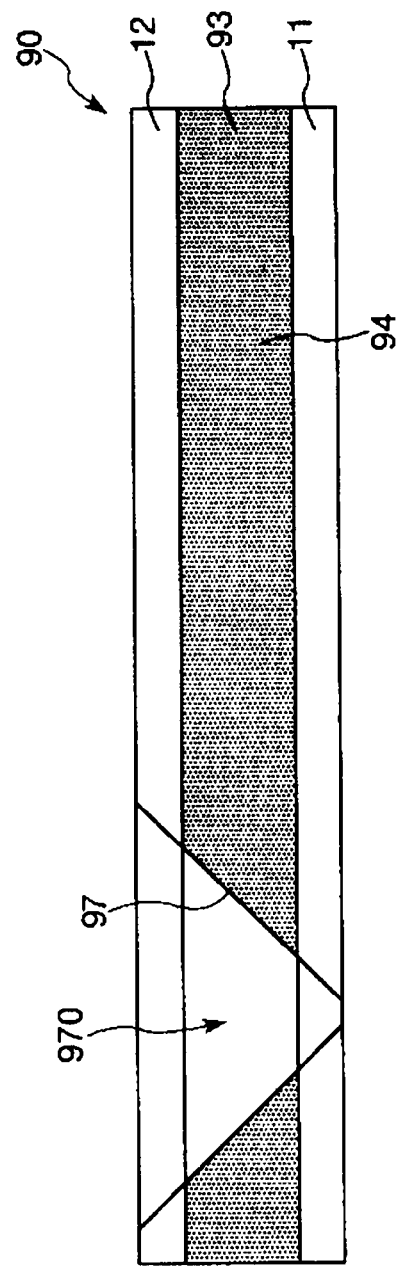
FIG. 13 is a section view showing the optical waveguide shown in FIG. 12 taken along the line X-X.

FIG. 11 is a perspective view showing the conventional optical waveguide (a part thereof is transparentized), FIG. 12 is a top view showing the optical waveguide shown in FIG. 11, and FIG. 13 is a section view showing the optical waveguide shown in FIG. 12 taken along the line X-X.

In the following description, the upper side in FIGS. 11 and 13 will be referred to as "upper" and the lower side thereof will be referred to as "lower".

The conventional optical waveguide 90 shown in FIG. 11 is the same as the optical waveguide 10 shown in FIG. 1, except that a core layer 93 of the conventional optical waveguide 90 has a structure different from that of the core layer 93 of the optical waveguide 10.

As shown in FIGS. 11 to 13, in the core layer 93 of the conventional optical waveguide 90, a mirror 97 is generally formed so that the entirety of a transverse section of a core portion 94 and a part of a transverse section of a side clad portion 95 (clad portion 96) are exposed therefrom.

This mirror 97 is constituted from one of two side surfaces of a concave portion 970 having a V-shape which is formed by digging processing so as to traverse (cross) the entirety of the core portion 94 and a part of the clad portion 96 in a width direction thereof.

In this regard, in each of FIGS. 11 to 13, dots are added to only the core layer 93. Specifically, relatively dense dots are added to the core portion 94 and relatively nondense dots are added to the side clad portion 95. Further, in each of FIGS. 11 and 12, a clad layer 12 is shown with being transparentized.

However, there is a problem in that profile irregularity of the mirror 97 is low in the conventional optical waveguide 90. The present inventors have found that a cause of the above problem is a difference between a processing rate of the core portion 94 and a processing rate of the clad portion 96 when forming the concave portion 970 by the digging processing.

In the case where the processing rates are different from each other, for example, even if a mirror 97 having a planar shape tries to be formed so as to traverse (penetrate) the core portion 94 and a part of the clad portion 96, the processing rate difference effects on a processing result, which makes impossible to form a mirror 97 having a desired shape. As one of causes which generate the processing rate difference, a chemical structure difference between a constituent material of the core portion 94 and a constituent material of the clad portion 96 can be exemplified.

As a result, conventionally, it is difficult to obtain a mirror 97 having high profile irregularity and optical performance without carrying out additional processing.

On the other hand, in the present invention, as shown in FIG. 1, the mirror 17 is formed within the mirror formation region 155 constituted from only the clad material. For this reason, the mirror 17 results in being constituted from the exposed surfaces 171, 173 and 172 formed of three kinds of materials as described above.

In such a mirror 17, since only the material constituting the side clad portion 15 is exposed (conventionally, as shown in FIG. 11, two kinds of materials constituting the core portion 94 and the clad portion 96 are exposed) from the exposed surface 173, the processing rate difference is not generated within this exposed surface 173.

Therefore, within at least this exposed surface 173, it is possible to form a mirror 17 having a desired shape easily and uniformly, to thereby obtain a mirror 17 having high profile irregularity (e.g. surface roughness, inplane uniformity) and optical performance without carrying out additional processing.

This makes it possible to obtain a superior optical waveguide 10 having high transmission efficiency due to suppression of light loss by the mirror 17.

In this regard, as described above, the exposed surface 173 located at the central part of the mirror 17 in the thickness direction thereof is irradiated with the light having strongest light intensity, to thereby dominate the optical performance of the mirror 17. Therefore, in the case where the profile irregularity (e.g. surface roughness, inplane uniformity) of at least the exposed surface 173 is high, it is possible to further improve the optical performance of the entirety of the mirror 17.

Further, the material constituting the clad layer 11 and the material constituting the clad layer 12 are also exposed from the mirror 17 shown in FIG. 1 in addition to the material constituting the side clad portion 15. In the case where the constituent material and chemical structure of each of the clad layers 11 and 12 is the same as (identical with) those of the constituent material of the side clad portion 15, the processing rate difference in the entirety of the mirror 17 including the exposed surface 173 is not generated when being processed. This makes it possible to further improve the profile irregularity and optical performance of the mirror 17.

In this regard, the constituent material and chemical structure of each of the clad layers 11 and 12 do not have to be completely the same as those of the side clad portion 15. Since each of the clad layer 11, the clad layer 12 and the side clad portion 15 is a clad portion, the constituent materials thereof have a relatively similar physical property.

Therefore, as compared with a case that the core material and the clad material are exposed from the mirror like the conventional optical waveguide, it is possible to dramatically lower the processing rate difference anyway, to thereby improve the profile irregularity and optical performance of the mirror 17.

Further, in this embodiment, although the mirror formation region 155 is formed of the constituent material of the side clad portion 15 and the constituent material of each of the clad layers 11 and 12, each clad material has high degree of freedom in selection of material and higher heat resistance than that of the core material (includes a chemical structure having higher heat resistance than that of the core material).

Therefore, the mirror 17 from which the clad material is exposed can have higher heat resistance as compared with the conventional mirror. As a result, for example, in the case where a heat treatment such as solder reflow is subjected to a substrate on which the optical waveguide is mounted, it is possible to prevent occurrence of disadvantages such as deformation of the mirror 17 due to impact of heat.

In this regard, even in the case where the clad material and the core material are same materials having different chemical structures, heat resistance of the clad material is higher than that of the core material. For this reason, according to the present invention, it is possible to obtain a mirror 17 having high heat resistance easily.

Further, in the case where the material exposed from the mirror 17 is only the clad material, a coefficient of thermal expansion of each part of the mirror 17 in an inplane direction thereof also becomes uniform (or has a close value).

Therefore, even if heat is accumulated to the mirror 17 by being irradiated with light conducted into the optical waveguide 10 for a long period of time, since the coefficient of thermal expansion of each part of the mirror 17 in the inplane direction thereof is uniform (or has the close value), it is possible to prevent significant deformation of the mirror 17 due to thermal expansion.

For this reason, according to the present invention, it is also possible to obtain an optical waveguide 10 whose longitudinal change of optical performance can be prevented.

In the case where, as shown by the arrow in FIG. 3, light is emitted from the light emitting element S provided below the optical waveguide 10 toward the mirror 17 described above, the emitted light is consecutively passed through the clad layer 11 and the side clad portion 15, and then reflected by the mirror 17.

After reflection, the reflected light is passed through a boundary surface 145 between the side clad portion 15 (mirror formation region 155) and the core portion 14, and then conducted into the core portion 14.

Meanwhile, if a distance from the mirror 17 to the boundary surface 145 is too large, a probability at which the light reflected by the mirror 17 leaks out into each clad layer 11 or 12 is increased. On the other hand, if the distance is too short, a probability at which the core portion 14 effects on the above-mentioned mirror 17 is increased. In this case, there is a fear that the above-mentioned processing uniformity and heat resistance of the mirror 17 is lowered.

From such a viewpoint, the distance from the mirror 17 to the boundary surface 145 on an axis line of the core portion 14 is preferably in the range of about 5 to 250 µm, and more preferably in the range of about 10 to 200 µm.

Further, a reflection film may be formed on the mirror 17, if needed. Examples of the reflection film include a metal film made of Au, Ag, Al or the like; a film made of a material having a lower refractive index than that of the mirror formation region 155; and the like.

Examples of a method of forming the metal film include a physical vapor deposition method such as a vacuum deposition method; a chemical vapor deposition method such as a CVD method; a plating method; and the like.

Further, although the concave portion 170 shown in FIGS. 1 to 3 is formed so as to pass through each of the clad layer 12, the core layer 13 and the clad layer 11 in the thickness direction thereof, it has only to be formed so as to pass through at least the core layer 13 in the thickness direction thereof and does not have to be formed so as to pass through the clad layer 11 in the thickness direction thereof.

In this regard, although only the material constituting the clad portion 16 (clad material) is exposed from the mirror 17 as described above, this condition has only to be satisfied within an area corresponding to an effective diameter of the emitted light (that is, an area associated with the optical communications).

In other words, the above condition may not be satisfied within another area than the effective diameter. This uneventfully allows the present invention to exhibit the effect thereof.

Next, a description will be made on one example of a method of manufacturing the optical waveguide 10.

The optical waveguide 10 are manufactured by producing the clad layer 11, the core layer 13 and the clad layer 12, respectively, and then laminating them together.

In such a manufacturing method, it is necessary to manufacture the optical waveguide 10 so that parts having different reflective indexes are in contact with each other physically and optically. Concretely, it is necessary to form the side clad portion 15 and the clad layers 11 and 12 so as to allow them to reliably adhere to the core portion 14 without gaps thereamong.

A concrete manufacturing method of the core layer 13 is not particularly limited as long as the core portion 14 and the side clad portion 15 can be produced in the same layer (core layer 13). Examples of the concrete manufacturing method include a photobleaching method, a photolithography method, a direct exposing method, a nanoimprinting method, a monomerdiffusion method and the like.

In this embodiment, as a representative, a description will be made on a method of manufacturing the optical waveguide 10 including the monomerdiffusion method.

Figure 8:
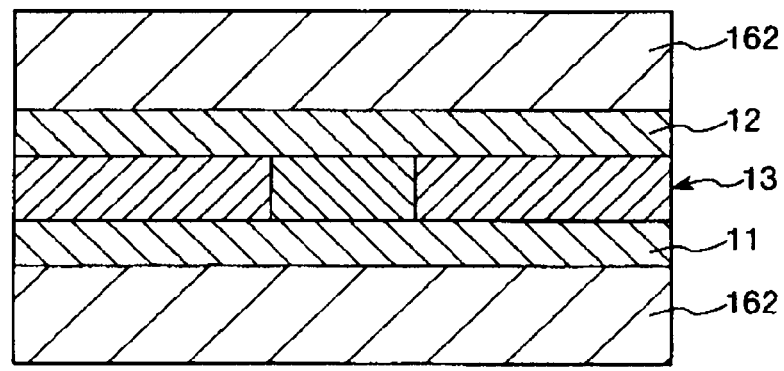
FIG. 8 is a sectional view schematically showing a process example of a method of manufacturing the optical waveguide shown in FIG. 1.
Figure 8:
Figure 8:
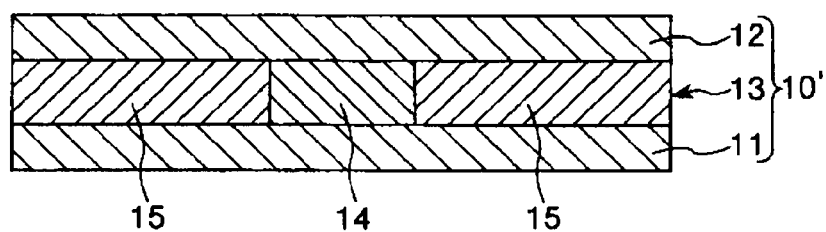
Figure 9:
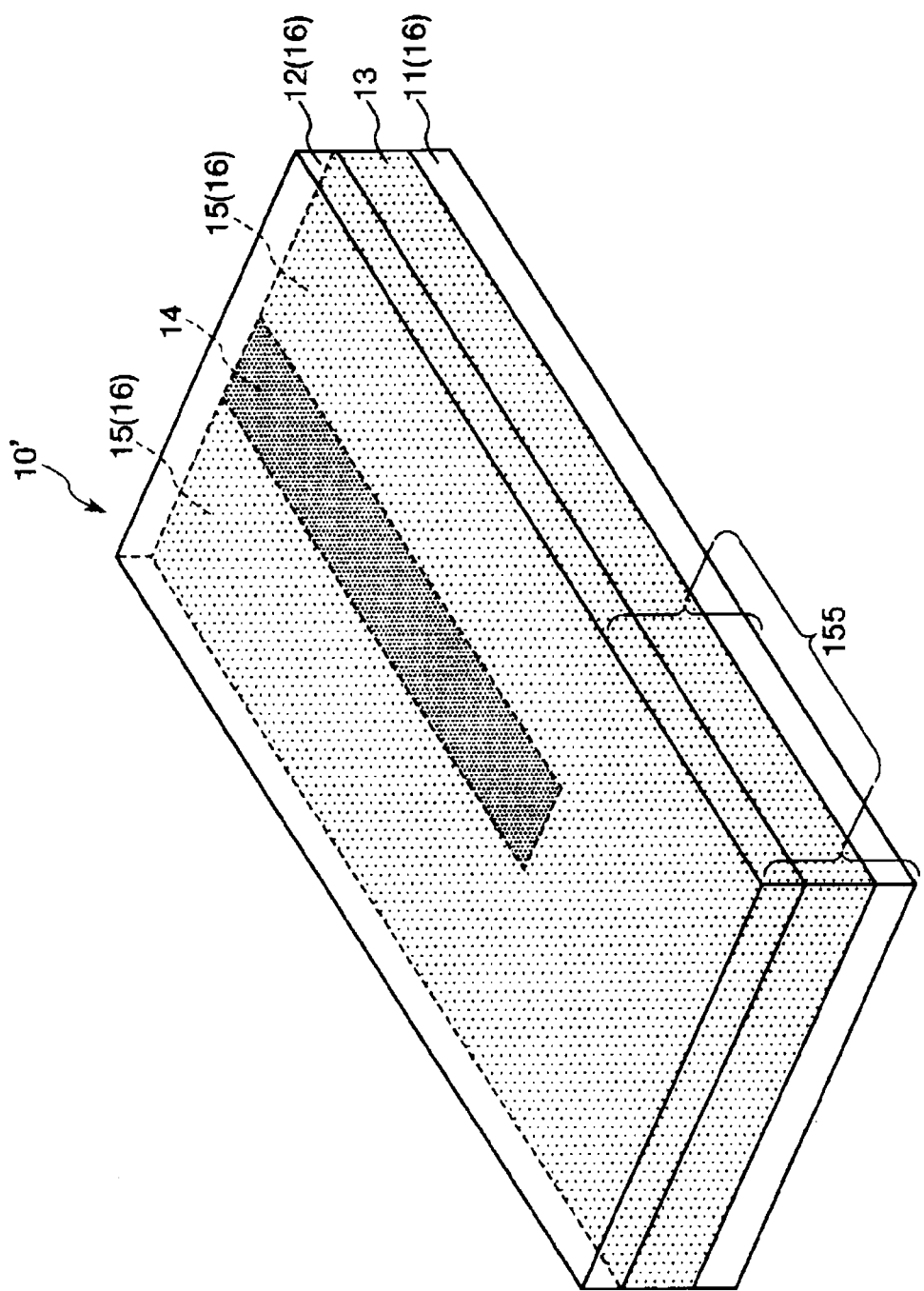
FIG. 9 is a perspective view showing the optical waveguide manufacturing member shown in FIG. 8 (a part thereof is transparentized) from another angle.
Figure 10:
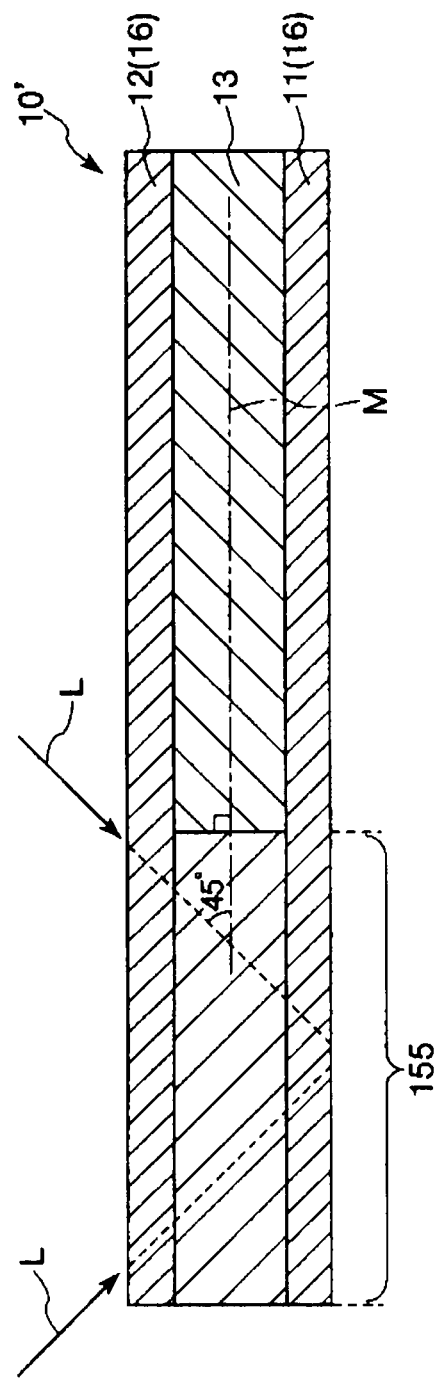
FIG. 10 is a sectional view schematically showing a process example of a method of manufacturing the optical waveguide shown in FIG. 1.

FIGS. 4 to 10 are sectional views each schematically showing a process example of the method of manufacturing the optical waveguide 10 shown in FIG. 1. In this regard, it is to be noted that FIGS. 4 to 8 are views each showing a cross section of the optical waveguide cut along a width direction thereof perpendicular to an axis line of the core portion, and FIG. 10 is a view showing a longitudinal section of the optical waveguide cut along a direction parallel to the axis line of the core portion.

Figure 4:
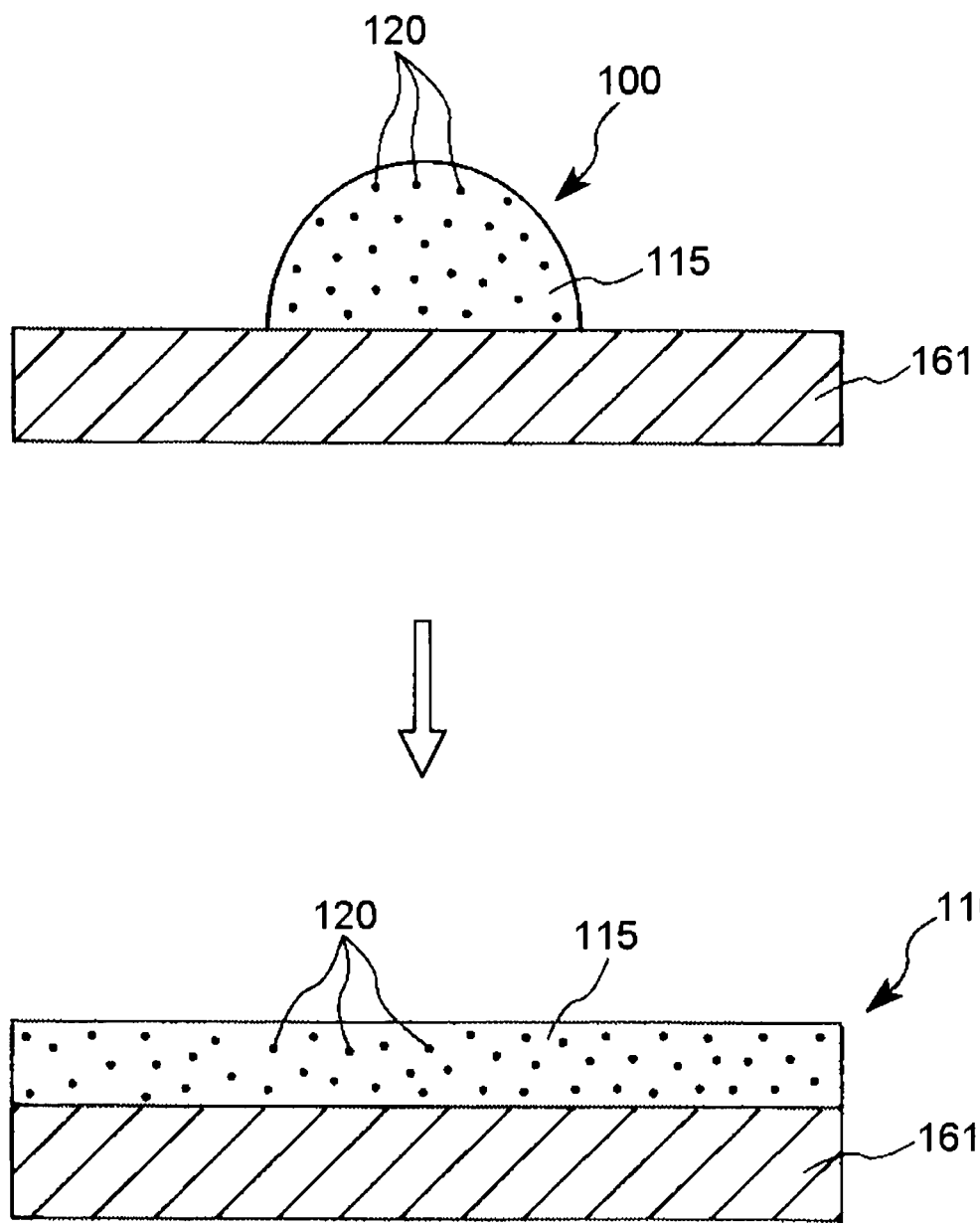
FIG. 4 is a sectional view schematically showing a process example of a method of manufacturing the optical waveguide shown in FIG. 1.

[1] First, a layer 110 is formed on a supporting substrate 161 (see FIG. 4).

The layer 110 is formed by using a method in which a core layer forming material (varnish) 100 is applied onto the supporting substrate 161, and then cured (hardened).

Specifically, the layer 110 is formed by applying the core layer forming material 100 onto the supporting substrate 1611 to form a liquid coating thereon, and then placing this supporting substrate 161 on a level table under a ventilatory state to thereby evaporate (desolvate) a solvent from the liquid coating while leveling uneven portions existing on a surface thereof.

In the case where the layer 110 is formed by using an application method, examples of the application method include a doctor blade method, a spin coating method, a dipping method, a table coating method, a spraying method, an applicator method, a curtain coating method, a die coating method and the like, but the application method is not limited thereto.

As the supporting substrate 161, for example, a silicon substrate, a silicon dioxide substrate, a glass substrate, a quartz substrate, a polyethylene terephthalate (PET) film and the like can be used.

The core layer forming material 100 is a material containing a developable material composed of a polymer 115 and an additive 120 (including at least a monomer and a catalyst). When the material is irradiated with active radiation and heated, a reaction of the monomer occurs in the polymer 115.

In the obtained layer 110, the polymer (matrix) 115 is substantially uniformly distributed in a random order, and in the polymer 115, the additive 120 is substantially uniformly dispersed in a random order. As a result, in the layer 110, the additive 120 is substantially uniformly dispersed in a random order.

An average thickness of such a layer 110 is appropriately set depending on a thickness of the core layer 13 to be formed. The average thickness is not limited to a specific value, but is preferably in the range of about 1 to 200 µm, more preferably in the range of about 5 to 100 µm, and even more preferably in the range of about 10 to 60 µm.

As the polymer 115, it is preferable to use a polymer having sufficiently high transparency (transparent and colorless) and compatibility with the monomer described below, and more preferable to use a polymer in which the monomer can be reacted (polymerized or cross-linked) as described below and whose sufficient transparency can be maintained even after the monomer is polymerized.

In this regard, the expression "having compatibility" means that the monomer can be at least blended with the polymer 115 so as to cause no phase separation between the monomer and the polymer 115 in the core layer forming material 100 and the layer 110.

Examples of such a polymer 115 include the constituent material of the core layer 13 described above.

In this regard, in the case where a norbornene-based polymer is used as the polymer 115, since the norbornene-based polymer has a high hydrophobic property, it is possible to obtain a core layer 93 whose dimensional change or the like hardly occurs due to water absorption thereof.

Further, the norbornene-based polymer may be either a homopolymer including a single kind of repeating units or a copolymer including two or more kinds of norbornene-based repeating units.

Among them, it is preferable to use a compound having repeating units each represented by the following formula (1) as one example of the copolymer.

Formula (1)

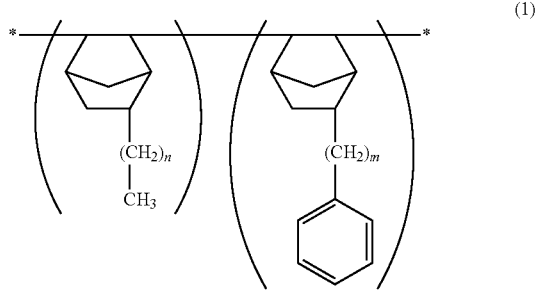

where "m" is an integer of 1 to 4 and "n" is an integer of 1 to 9.

The copolymer can have any form in which one kind and the other kind of the repeating units represented by the above formula (1) may be arranged in an arbitrary order (in a random manner), in alternate manner, or in a block manner.

Here, in the case where the norbornene-based polymer is used as the polymer 115, it is preferred that one including a norbornene-based monomer, a cocatalyst (first substance) and a procatalyst (second substance) is selected as one example of the additive 120.

The norbornene-based monomer is reacted within an irradiated region of the layer 110 which are irradiated with the activated radiation described later to produce a reaction product. As a result, a refractive index difference between the irradiated region of the layer 110 and a non-irradiated region thereof which are not irradiated with the activated radiation is produced due to existence of the reaction product.

Such a reaction product contains at least one kind selected from the group comprising a polymer obtained by polymerizing the norbornene-based monomer in the polymer (matrix) 115, a cross-linking chemical structure obtained by cross-linking the polymer 115, and a branching chemical structure (that is, a branching polymer or a side chain such as a pendant group) obtained by polymerizing with the polymer 115 to branch therefrom.

Here, in the case where it is required that the refractive index of the irradiated region of the layer 110 becomes high, a polymer 115 having a relatively low refractive index is used in combination with a norbornene-based monomer having a refractive index higher than that of the polymer 115. On the other hand, in the case where it is required that the refractive index of the irradiated region of the layer 110 becomes low, a polymer 115 having a relatively high refractive index is used in combination with a norbornene-based monomer having a refractive index lower than that of the polymer 115.

In this regard, it is to be noted that the term "high" or "low" for the refractive index does not mean an absolute value of the refractive index, but means a relative relation between refractive indexes of two certain materials.

In the case where the refractive index of the irradiated region of the layer 110 is lowered due to the reaction of the norbornene-based monomer (production of the reaction product), the irradiated region becomes the side clad portion 15. On the other hand, in the case where the refractive index of the irradiated region of the layer 10 is increased due to the reaction of the norbornene-based monomer, the irradiated region becomes the core portion 14.

The procatalyst (second substance) is a substance which can initiate the reaction (e.g., polymerization reaction, cross-linking reaction) of the monomer and whose activation temperature is changed under the action of an activated cocatalyst (first substance) by being irradiated with the activated radiation described below.

Any substance whose activation temperature is changed (raised or lowered) according to the irradiation of the activated radiation can be used as the procatalyst, but a substance whose activation temperature is lowered according to the irradiation of the activated radiation is especially preferred.

This makes it possible to form a core layer 93 (optical waveguide 10) by being subjected to a heat treatment at a relatively low temperature. Further, this also makes it possible to suppress layers other than the core layer 93 from being heated unnecessarily. As a result, lowering of the property (optical transmission property) of the optical waveguide 10 can be prevented.

It is preferable to use a procatalyst containing (mainly constituted of) at least one of compounds represented by the following formulae (Ia) and (Ib).

$$(E(R)_3)_2Pd(Q)_2 \tag{Ia}$$

$$[(E(R)_3)_aPd(Q)(LB)_b]_p[WCA]_r \tag{Ib}$$

where in each of the formulae (Ia) and (Ib), $E(R)_3$ is a Group 15 neutral electron donor ligand, E is an element selected from the group comprising elements of Group 15 of the Periodic Table, and R is one of a hydrogen atom (or an isotope thereof) and a hydrocarbon group-containing moiety, Q is an anionic ligand selected from the group comprising carboxylate, thiocarboxylate and dithiocarboxylate. Further, in the formula (Ib), LB is a Lewis base, WCA is a weakly coordinating anion, "a" is an integer of 1 to 3, "b" is an integer of 0 to 2, a total number of "a" and "b" is to 3, and "p" and "r" are integers for maintaining balance between an electronic charge of a palladium cation and an electronic charge of the weakly coordinating anion.

Examples of an exemplary procatalyst in accordance with the formula (Ia) include $Pd(OAc)_2(P(i-Pr)_3)_2$, $Pd(OAc)_2(P(Cy)_3)_2$, $Pd(O_2CCMe_3)_2(Cy)_3)_2$, $Pd(OAc)_2(P(Cp)_3)_2(Pd(O_2CCF_3)_2(P(Cy)_3)_2$ and $Pd(O_2CC_6H_5)_3(P(Cy)_3)_2$, but the exemplary procatalyst is not limited thereto. In this regard, "Cp" is a cyclopentyl group, and "Cy" is a cyclohexyl group.

Further, a procatalyst represented by the formula (Ib), in which each of "p" and "q" is selected from an integer of 1 or 2, is preferred.

Examples of an exemplary procatalyst in accordance with the formula (Ib) include $Pd(OAc)_2(P(Cy)_3)_2$. In this regard, "Cy" is a cyclohexyl group and "Ac" is an acetyl group.

These procatalysts can effectively react the monomer. In the case where the monomer is the norbornene-based monomer, they can effectively polymerize or cross-link the monomer via an addition polymerization reaction.

The cocatalyst (first substance) is a substance which is activated by being irradiated with the activated radiation and can change the activation temperature of the procatalyst (that is, a polymerization initiation temperature of the monomer).

As such a cocatalyst, any substances can be used as long as it is activated due to change (reaction or cleavage) of a chemical structure thereof by being irradiated with the activated radiation. Among them, a substance containing (mainly consisted of) a compound (photoinitiator), which is cleaved by being irradiated with activated radiation having a predetermined wavelength, is preferably used.

In this regard, such a compound (photoinitiator) can produce a cation such as a proton or another positive ion and a weakly coordinating anion (hereinafter, referred to as "WCA") capable of be substituted for a cleavable group included in the procatalyst due to the cleavage thereof.

Examples of the weakly coordinating anion include a tetrakis (pentafluorophenyl) boric acid ion (hereinafter, referred to as "FABA$^-$"), a hexafluoro antimonic acid ion (hereinafter, referred to as "SbF$_6^-$") and the like.

Examples of the cocatalyst (photo acid generator or photo base generator) include tetrakis (pentafluorophenyl) gallate, aluminates, antimonates, other borates, other gallates, carborane and halocarboranes in addition to tetrakis (pentafluorophenyl)borate and hexafluoro antimonate.

Further, the core layer forming material (varnish) 100 may contain a sensitizing agent, if needed.

Furthermore, the core layer forming material 100 may contain an anti-oxidizing agent. This makes it possible to prevent generation of undesirable free radicals and/or natural oxidation of the polymer 115. As a result, it is possible to improve properties of the obtained core layer 13 (optical waveguide 10).

The layer 110 is formed by using the core layer forming material 100 as described above.

At this time, the layer 110 has a first refractive index. This first refractive index is obtained under the actions of the polymer 115 and the monomer each dispersed (distributed) uniformly in the layer 110.

Further, the above description with regard to the additive 120 is made on the case that the norbornene-based monomer is used as the monomer by way of example. However, other monomers than the norbornene-based monomer may be used as long as they have polymerizable chemical structures.

Examples of such other monomers include an acrylic acid (methacrylic acid)-based monomer, an epoxy-based monomer, a styrene-based monomer and the like. These monomers can be used singly or in combination of two or more of them.

In this regard, the catalyst contained in the additive 120 may be appropriately selected depending on the kind of monomer to be used. In the case where the monomer is the acrylic acid-based monomer or the epoxy-based monomer, the addition of the procatalyst (second substance) can be omitted.

Figure 5:
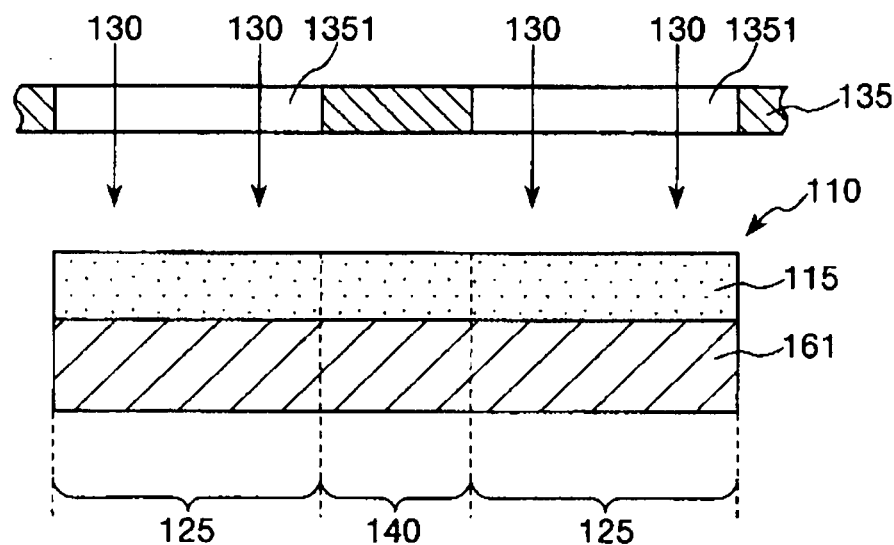
FIG. 5 is a sectional view schematically showing a process example of a method of manufacturing the optical waveguide shown in FIG. 1.
Figure 6:
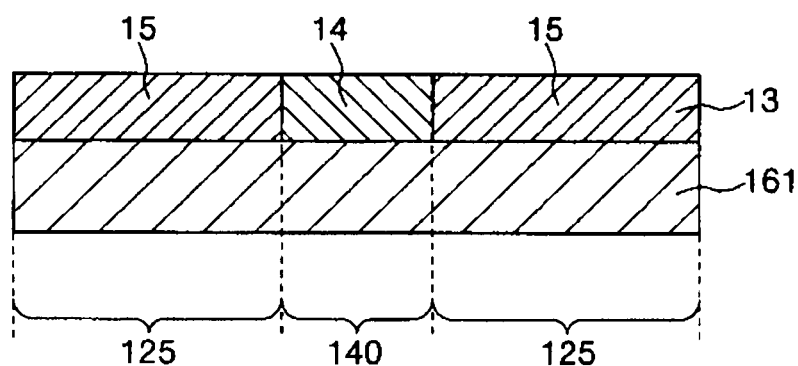
FIG. 6 is a sectional view schematically showing a process example of a method of manufacturing the optical waveguide shown in FIG. 1.

[2] Next, a mask (masking) 135 provided with an opening (window) 1351 is prepared, and then the layer 110 is irradiated with the activated radiation (activated energy beam) 130 through the mask 135 (see FIG. 5).

Hereinafter, a description will be made on a case that a monomer having a refractive index lower than that of the polymer 115 is used and a refractive index of the core layer forming material 100 is lowered in the irradiated region 125 which has been irradiated with the activated radiation 130.

Namely, in this case, the irradiated region 125 which has been irradiated with the activated radiation 130 becomes the side clad portion 15 of the core layer 13.

Therefore, in the mask 135 of this case, formed is an opening (window) 1351 having a pattern corresponding to that of the side clad portion 15 to be formed. This opening 1351 defines a transmission portion through which the activated radiation 130 to be used for irradiating is passed.

The mask 135 may be either a mask which has been made in advance (independently) such as a mask having a plate shape or a mask which is formed on the layer 110 by using, for example, a vapor phase deposition method or an application method.

The activated radiation 130 to be used has only to be able to cause an optical reaction (change) of the cocatalyst. For example, an electron ray, an X ray or the like can be used in addition to a visible light, an UV light, an infrared light and a laser beam.

When the layer 110 is irradiated with the activated radiation 130 through the mask 135, the cocatalyst (first substance) existing within the irradiated region 125 which has been irradiated with the activated radiation 130 is reacted (bonded) or cleaved under the action of the activated radiation 130, to thereby extricate (produce) the cation (proton or another positive ion) and the weakly coordinating anion (WCA).

At this time, the cation or the weakly coordinating anion causes change (cleavage) of the chemical structure of the procatalyst (second substrate) existing within the irradiated region 125. This allows the procatalyst to be brought into an active but latent state (latent active state).

In this regard, it is to be noted that in the case where light having high directivity such as the laser beam is used as the activated radiation 130, the use of the mask 135 may be omitted.

[3] Next, the layer 110 is subjected to a heat treatment (first heat treatment).

At this time, the procatalyst in the active but latent state is activated (brought into an active state) within the irradiated region 125, as a result of which the monomer is reacted (polymerized or cross-linked).

When the reaction of the monomer progresses within the irradiated region 125, a concentration of the monomer therein is gradually lowered. In this way, a concentration difference of the monomer between the irradiated region 125 and the non-irradiated region 140 is generated. In order to eliminate the concentration difference, the monomer contained in the non-irradiated region 140 is diffused and assembled to the irradiated region 125. This phenomenon is referred to as "monomer diffusion".

As a result, the monomer and/or the reaction product thereof (polymer, cross-linking chemical structure or branching chemical structure) are increased within the irradiated region 125. The chemical structure derived from the monomer remarkably has an effect on the refractive index of the irradiated region 125 so that it is lowered up to a second refractive index lower than the first refractive index. In this case, an addition-type (co)polymer is mainly produced as the polymer obtained by polymerizing the monomer.

On the other hand, since the monomer is diffused from the non-irradiated region 140 to the irradiated region 125, an amount of the monomer contained in the non-irradiated region 140 is lowered. The polymer 115 remarkably has an effect on the refractive index of the non-irradiated region 140 so that it is increased up to a third refractive index higher than the first refractive index.

In this way, a refractive index difference between the irradiated region 125 and the non-irradiated region 140 (second refractive index<third refractive index) is generated. As a result, the core portion 14 (non-irradiated region 140) and the side clad portion 15 (irradiated region 125) are formed (see FIG. 6).

[4] Next, the layer 110 is subjected to a second heat treatment.

By doing so, the procatalyst remaining in the irradiated region 125 and/or the non-irradiated region 140 is activated (brought into the active state) directly or via the activation of the cocatalyst. As a result, the monomer remaining in each of the irradiated and non-irradiated regions 125 and 140 is reacted.

In this way, by reacting the monomer remaining in each of the irradiated and non-irradiated regions 125 and 140, it is possible to stabilize the core portion 14 and side clad portion 15 to be obtained.

[5] Next, the layer 110 is subjected to a third heat treatment.

This makes it possible to reduce internal stress which would occur in the obtained core layer 13 and to further stabilize the core portion 14 and the side clad portion 15.

Through the above steps, the core layer 13 including the core portion 14 and the side clad portion 15 is obtained.

In this regard, it is to be noted that in the case where the refractive index difference between the core portion 14 and the side clad portion 15 is sufficiently generated before the layer 110 is subjected to the second heat treatment and/or the third heat treatment, this step [5] and/or the above step [4] may be omitted.

Figure 7:
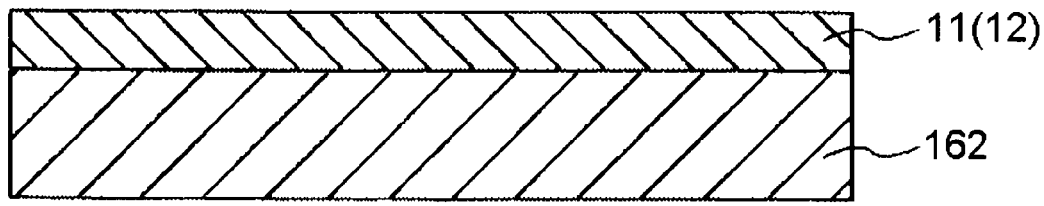
FIG. 7 is a sectional view schematically showing a process example of a method of manufacturing the optical waveguide shown in FIG. 1.

[6] Next, the clad layer 11 (12) is formed on a supporting substrate 162 (see FIG. 7).

Examples of a method of forming the clad layer 11 (12) include various methods such as a method in which a vanish containing a clad material (clad layer forming material) is applied onto the supporting substrate 162 and then cured (hardened) and a method in which a monomer composition having a curing property is applied onto the supporting substrate 162 and then cured (hardened).

In the case where the clad layer 11 (12) is formed by using an application method, examples of the application method include a spin coating method, a dipping method, a table coating method, a spraying method, an applicator method, a curtain coating method, a die coating method and the like.

As the supporting substrate 162, the same one as the supporting substrate 161 can be used.

In this way, the clad layer 11 (12) is formed on the supporting substrate 162.

[7] Next, the core layer 13 is peeled off from the supporting substrate 161, and then put between the clad layer 11 formed on the supporting substrate 162 and the clad layer 12 formed on the supporting substrate 162 (see FIG. 8).

Thereafter, the supporting substrate 162 on which the clad layer 12 is formed is compressed from an upper surface side thereof, so that the clad layers 11 and 12 and the core layer 13 are bonded together.

In this way, the clad layers 11 and 12 and the core layer 13 are bonded and unified together, to thereby obtain an optical waveguide manufacturing member 10' (that is, an optical waveguide manufacturing member according to the present invention).

Here, FIG. 9 is a perspective view showing the optical waveguide manufacturing member shown in FIG. 8 (a part thereof is transparentized) from another angle. In the following description, the upper side in FIG. 9 will be referred to as "upper" and the lower side thereof will be referred to as "lower".

The optical waveguide manufacturing member 10' shown in FIG. 9 is formed by laminating the clad layer 11, the core layer 13 and the clad layer 12 in this order from a lower side thereof. Among these layers, within the core layer 13, the core portion 14 and the side clad portion 15 adjoined so as to surround side surfaces of the core portion 14 and one of ends thereof are formed.

Namely, a part of the side clad portion 15 is arranged so as to prevent the one end of the core portion 14 from being exposed outside. Therefore, although the other end of the core portion 14 is exposed outside, the one end thereof is in a state covered with the side clad portion 15.

In this regard, it is to be noted that the above-mentioned mirror formation region 155 is constituted from a laminated body in which a part of the side clad portion 15, a part of the clad layer 11 located therebelow and a part of the clad layer 12 located thereabove are laminated together.

The mirror 17 can be formed by subjecting the mirror formation region 155 to processing, to thereby obtain the above-mentioned optical waveguide 10. In other words, the optical waveguide manufacturing member 10' is a member having the mirror formation region 155, which is to be subjected to the processing for manufacturing the mirror 17, provided on an extension line of the core portion 14, so that it is used for forming the optical waveguide 10.

In this regard, it is to be noted that the above-mentioned compression bonding operation is preferably carried out under the heating condition. Although a heating temperature is appropriately set depending on the constituent material of the clad layer 11, 12 or the core layer 13 or the like, it is preferably in the range of about 80 to 200° C., and more preferably in the range of about 120 to 180° C. in a general way.

Next, the supporting substrate 162 is peeled off and removed from each of the clad layers 11 and 12.

[8] Next, a concave portion 170 having a V-shape is formed within a laminated body constituted from the clad layer 11, the core layer 13 and the clad layer 12 (that is, the optical waveguide manufacturing member 10') from a side of the clad layer 12 so that a part of the concave portion 170 is pass through the optical waveguide manufacturing member 10' in a thickness direction thereof (see FIG. 10).

In the case where the optical waveguide manufacturing member 10' is irradiated with a laser beam L along a broken line shown in FIG. 10, it is cut by two side surfaces (processing surfaces) traversing the core layer 13 at an angle and an inner side thereof is removed, to thereby form the concave portion 170. The mirror 17 is constituted from one of the two side surfaces of the concave portion 170 (that is, the side surface positioned at the right side in FIG. 10).

In this regard, it is to be noted that the position where the mirror 17 is formed is set inside the mirror formation region 155 in the core layer 13. Further, the broken line shown in FIG. 10 indicates a surface slanting at 45° with regard to the extension line of the axis line M of the core portion 14.

Examples of a method of forming the concave portion 170 include a laser processing method, a cutting method, a grinding method and the like. Among them, it is preferable to use the laser processing method. According to the laser processing method, since a laser having high directivity is used, it is possible to carry out reliable processing at high dimensional accuracy.

Further, in the case where the other methods are used, there is a fear that burr and the like occur on a cutting surface, whereas in the case where the laser processing method is used, it is possible to process a work piece while being melted depending on a kind and/or wavelength of the laser to be used. Therefore, according to the laser processing method, it is possible to prevent occurrence of burr on a cutting surface and make a surface of the mirror 17 smooth by covering the cutting surface with a molten material.

This makes it possible to form a superior mirror which can reflect light at a constant reflection angle and suppress diffuse reflection of light.

Example of laser used in the laser processing method include $CO_2$ laser to be produced by using a $CO_2$ gas as a laser medium, YAG laser to be produced by using a YAG (yttrium·aluminium·garnet) crystal as a laser medium, fluorine laser ($F_2$ laser), ArF excimer laser, and the like.

In this regard, for example, in the case where the concave portion 170 is formed using the laser beam, it is possible to obtain a mirror 17 having high smoothness. Surface roughness (arithmetical mean deviation of profile Ra) of the mirror 17 is 0.02 μm or less, although this value varies slightly depending on the constituent material of the mirror formation region 155, the conditions of the laser processing or the like.

As described above, the description has been made on the method of manufacturing the optical waveguide 10 according to the monomerdiffusion method. However, as described above, the other methods may be used as the method of manufacturing the optical waveguide 10.

Among them, in the photbleaching method, for example, used is a core layer forming material containing a cleaving agent (substance) that is activated by being irradiated with activated radiation, and a polymer that includes a main chain and cleavable groups (cleavable pendant groups) each branching from the main chain and having a chemical structure in which at least a part thereof can be cleaved and removed from the main chain under the action of the activated cleaving agent.

After this core layer forming material is formed in a layer shape, a specific region of the layer is irradiated with activated radiation such as an ultraviolet ray, so that the cleavable groups are cleaved (cut) to thereby change (raise or lower) a refractive index of the region. For example, if the refractive index is lowered according to the cleavage of the cleavable groups, a region irradiated with the activated radiation becomes the side clad portion 15 and another region becomes the core portion 14.

After the core layer 13 is formed in this way, the clad layers 11 and 12 are bonded to both surfaces of the core layer 13 as described above.

On the other hand, in the photolithography method, for example, a layer of a core portion forming material having a high refractive index is formed on the clad layer 11, and further a resist film having a shape corresponding to the core portion 14 is formed on the layer by using a photolithography technology. Then, the layer of the core portion forming material is etched through the resist film as a mask. By doing so, the core portion 14 is obtained.

Thereafter, a clad portion forming material having a relatively low refractive index is applied on it so as to cover the core portion 14. Consequently, a region other than the core portion 14 is filled with the clad portion forming material, to thereby obtain the side clad portion 15. Furthermore, the clad portion forming material is applied on the core portion 14 and the side clad portion 15 so as to cover them, to thereby obtain the clad layer 12.

In this way, the optical waveguide 10 (that is, an optical waveguide according to the present invention) is obtained.

According to the above method, the core portion 14 and the side clad portion 15 can be formed at the same time in a single manufacturing step.

Further, the core portion 14 and the side clad portion 15 are constituted from materials whose chemical structures are different from each other, but whose kinds are similar to each other. Therefore, both can have an equal coefficient of thermal expansion. This makes it possible to suppress defects such as deformation and delamination of the optical waveguide due to temperature change as compared with a case that the core portion 14 and the side clad portion 15 are constituted from different materials, respectively.

In this regard, the above description is made on the method of forming the concave portion 170 with respect to the laminated body (optical waveguide manufacturing member 10') in which the clad layer 11, the core layer 13 and the clad layer 12 are laminated together.

However, the optical waveguide 10 may be obtained by preparing two respective parts corresponding to parts into which the optical waveguide manufacturing member 10' is, in advance, separated right and left at the boundary surface 145, forming the concave portion 170 with regard to the part including the mirror formation region 155, and then bonding the respective parts together.

In this case, by forming the entirety of the part including the mirror formation region 155 using the same material, it is possible to obtain a mirror 17 consisting of an exposed surface from which the same material is exposed. Such a mirror 17 can have superior profile irregularity such as surface roughness or inplane uniformity. In this regard, such a part can be produced by using, for example, an extrusion method or the like.

Further, among the parts corresponding to the parts into which the optical waveguide manufacturing member 10' is, in advance, separated right and left at the boundary surface 145, the part including no mirror formation region 155 can be, for example, produced by extruding the material constituting the core portion 14 and the material constituting the clad portion 16 at the same time.

While the optical waveguide of the present invention has been described hereinabove with reference to the embodiment shown in the drawings, the present invention is not limited thereto. The configurations of the respective parts may be substituted by or added with other arbitrary configurations having equivalent functions.

For example, in the above embodiment, the mirror angle of the mirror 17 (that is, an angle between the axis line M of the core portion 14 and the surface of the mirror 17) is 45°, but is not limited thereto. The mirror angle may be another value (that is, a value within a range of about 30 to 60°).

Further, the mirror 17 may be constituted from a curved surface which can condense reflected light to the core portion 14.

Furthermore, in the above embodiment, the light emitting element S is arranged so that the emitted light becomes perpendicular to the axis line M of the core portion 14, but the direction where the light emitting element S is arranged is not limited thereto. For example, the travelling direction of the emitted light may not be perpendicular to the axis line M of the core portion 14 as long as it faces the mirror 17.

Moreover, the mirror 17 may be provided in a middle of the optical waveguide 10.

Further, in the above embodiment, the description is made on the optical waveguide 10 constituted from the laminated body in which the clad layer 11, the core layer 13 and the clad layer 12 are laminated together. The optical waveguide of the present invention does not have such a laminated structure, but may have a structure including a core portion having an elongated shape and a clad portion provided so as to cover side surfaces of the core portion. In this case, the clad portion may be formed of a single clad material or a material combining two or more kinds of clad materials.

In the case where the clad portion is formed of the material combining two or more kinds of clad materials, although the two or more kinds of clad materials may be exposed from the mirror 17, only one of the clad materials is preferably exposed therefrom.

Meanwhile, the optical waveguide of the present invention can be used in, for example, an optical wiring line for optical communication.

By mounting this optical wiring line on a substrate together with a conventional electrical wiring line, it is possible to produce a so-called optical/electrical combination substrate. In such an optical/electrical combination substrate, for example, optical signals transmitted through the optical wiring line (that is, the core portion of the optical waveguide) are converted to electrical signals by an optical device, and then the electrical signals are transferred to the electrical wiring line.

Therefore, in such as optical/electrical combination substrate, the optical wiring line can transfer information in a larger volume and at a higher speed than a conventional electrical wiring line. Accordingly, if the optical/electrical combination substrate is used in, for example, a bus interconnecting an operation device such as a CPU or an LSI and a storage device such as a RAM, it becomes possible to enhance overall system performance and to suppress generation of electromagnetic noises.

In this regard, it is thinkable to mount the optical/electrical combination substrate to electronic devices for transferring a large volume of data at a high speed, such as cellular phones, game machines, personal computers, television sets and home servers.

EXAMPLES

Hereinafter, a description will be made on concrete examples of the present invention.

1. Manufacture of Optical Waveguide

Example

First, an optical waveguide manufacturing member shown in FIGS. 9 and 10 was prepared. This optical waveguide manufacturing member was obtained by laminating a core layer and clad layers each formed of a norbornene-based polymer together.

Next, a mirror formation region of the optical waveguide manufacturing member was subjected to digging processing by being irradiated with a laser beam at a predetermined angle with respect to an extension line of a core portion. In this way, a mirror was formed, to thereby obtain an optical waveguide shown in FIGS. 1 to 3. From the mirror of the manufactured optical waveguide, a material constituting a side clad portion (clad material) and a material constituting the clad layers (clad material) were exposed.

In this regard, in this Example, 32 optical waveguide samples in total were manufactured in the same manner as described above. In the respective samples, angles of the mirrors were different from each other. The angles of the mirrors were adjusted in the respective samples so that the angles distribute substantially equally in the range of 40 to 50°.

Comparative Example 1

An optical waveguide was manufactured in the same manner as in Example except that the structure thereof was changed to a structure shown in FIGS. 11 to 13. From the mirror of the manufactured optical waveguide, a material constituting a core portion (core material), a material constituting a side clad portion and a material constituting clad layers were exposed.

In this regard, in this Comparative Example 1, 12 optical waveguide samples in total were manufactured in the same manner as described above. In the respective samples, angles of the mirrors were different from each other. The angles of the mirrors were adjusted in the respective samples so that the angles distribute substantially equally in the range of 40 to 50°.

Comparative Example 2

An optical waveguide was manufactured in the same manner as in Comparative Example 1 except that a polymer different from that of Comparative Example 1 was used. From the mirror of the manufactured optical waveguide, a material constituting a core portion, a material constituting a side clad portion and a material constituting clad layers were exposed.

In this regard, in this Comparative Example 2, 30 optical waveguide samples in total were manufactured in the same manner as described above. In the respective samples, angles of the mirrors were different from each other. The angles of the mirrors were adjusted in the respective samples so that the angles distribute substantially equally in the range of 40 to 50°.

2. Evaluation of Optical Waveguide

On each of the samples (optical waveguides) obtained in Example and Comparative Examples, insertion loss of the mirror was measured according to the following measurement conditions.

<Measurement Conditions>
Light source: VCSEL 100 μmΦ (no oil at mirror side)
Wavelength of light source: 830 nm
Output of light source: 0.6 mW
Intensity of incoming light $P_0$: 1.0 V In this regard, in the case where intensity of incoming light to the mirror is defined as "$P_0$" and intensity of outgoing light from the mirror is defined as "P", the insertion loss of the mirror was calculated according to the following expression.

$$(\text{Insertion loss}) = -10 * \log(P/P_0)$$

Figure 14:
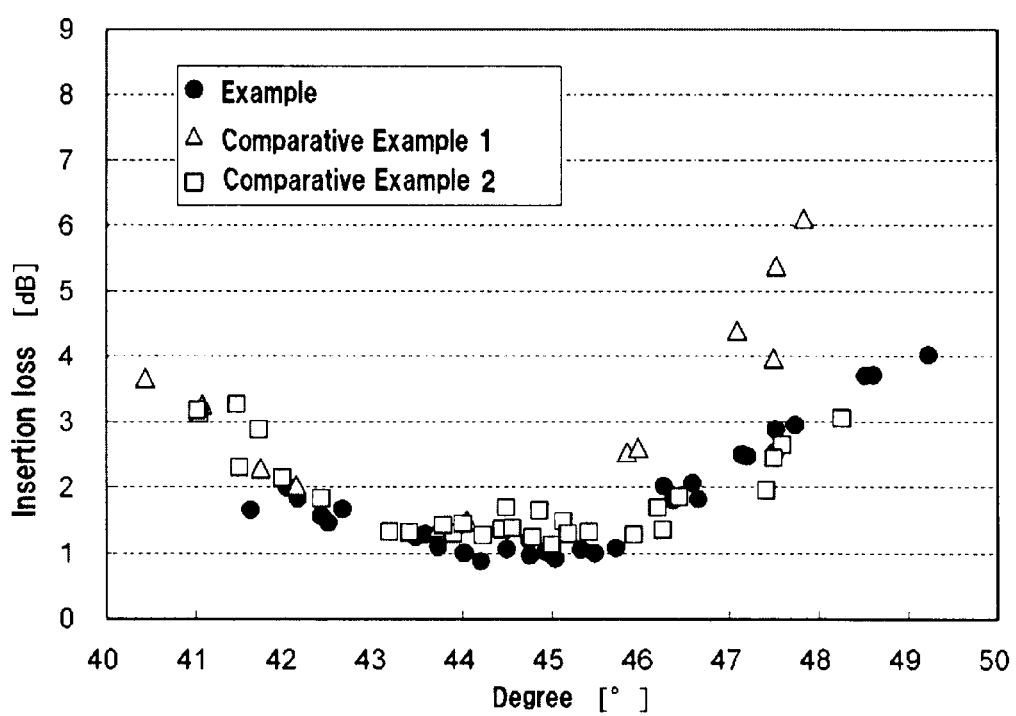
FIG. 14 is a scatter diagram produced by plotting an angle of a mirror along a horizontal axis and a calculated insertion loss along a horizontal axis, on each of samples obtained in Examples and respective Comparative Examples.

A scatter diagram was produced by plotting the angle of the mirror (unit: degree) of each of the samples along a horizontal axis and the calculated insertion loss (unit: dB) thereof along a horizontal axis. A graph of the produced scatter diagram is shown in FIG. 14. Further, among the respective samples, a minimum value of the insertion loss and an angle range (approximate calculation) of the mirror within which the insertion loss falls below 1.5 dB are shown in Table 1.

TABLE 1

| | Manufacturing condition | Evaluation result | |
|---|---|---|---|
| | Material exposing from mirror | Minimum value of insertion loss | Angle range of mirror within which insertion loss falls below 1.5 dB |
| Example | Only clad material | 0.88 dB | 43 to 46° |
| Comparative Example 1 | Core material and clad material | 1.39 dB | 43 to 44° |
| Comparative Example 2 | Core material and clad material | 1.14 dB | 43 to 46° |

As is evident in FIG. 14, it is found that the samples manufactured in Example totally have small insertion loss.

On the other hand, it is found that the samples manufactured in each of Comparative Examples totally have large insertion loss. Especially, an insertion loss difference between the samples manufactured in Example and the samples manufactured in Comparative Example 1 is large, although the compositions of the constituent materials (polymers) thereof are identical with each other.

As is evident in Table 1, the minimum value of the insertion loss in the samples obtained in Example falls below 1 dB, and thus they have especially excellent properties. Therefore, it can be said that the optical waveguides obtained in Example have high transmission efficiency.

Further, in the samples obtained in Example, it also becomes obvious that the angle range of the mirror within which the insertion loss falls below 1.5 dB is sufficiently wide. This indicates that permissible margin of manufacturing error on the angle of the mirror is relatively wide in forming a mirror which can have superior transmission efficiency. Therefore, since the angle of the mirror does not have need to be adjusted strictly in Example, it becomes obvious that an optical waveguide having high quality can be easily manufactured.

INDUSTRIAL APPLICABILITY

An optical waveguide according to the present invention includes a core portion having an elongated shape; a clad portion provided so as to adjoin the core portion; and a mirror consisting of a processing surface traversing an extension line of a light axis of the core portion at an angle, wherein only a material other than a material constituting the core portion is exposed from the processing surface. Therefore, since the mirror is constituted from the processing surface from which a material capable of being uniformly processed at high accuracy is exposed, it can have superior profile irregularity and optical performance. This makes it possible to provide an optical waveguide having high transmission efficiency and superior quality. Further, a material constituting a clad portion has generally high degree of freedom in selection of material and higher heat resistance than that of a material (or chemical structure) constituting a core portion. Therefore, in the case where the material constituting the clad portion is exposed from the processing surface of the mirror, it is possible to improve heat resistance of the mirror. As a result, it is possible to provide an optical waveguide having sufficient heat resistance against a heat treatment such as solder reflow. Furthermore, an optical waveguide manufacturing member according to the present invention can be easily processed into the optical waveguide as described above. Accordingly, the optical waveguide and optical waveguide manufacturing member according to the present invention have industrial applicability.

What is claimed is:

1. An optical waveguide comprising:
a core portion comprising a core material and having an elongated shape; and
a clad portion comprising a clad material and adjoining the core portion such that the clad material of the clad portion is surrounding an end portion and side surfaces of the core portion,
wherein the clad portion has a concave portion having a processing surface traversing an extension line of a light axis of the core portion at an angle such that the processing surface of the concave portion forms a mirror configured to reflect light passing through the clad material of the clad portion toward the end portion of the core portion and that the processing surface forming the mirror is formed at a distance in a range of 5 to 250 µm from the end portion of the core portion on the extension line of the light axis of the core portion.

2. The optical waveguide as claimed in claim 1, wherein the core material of the core portion comprises a base material which is same as a base material forming the clad material of the clad portion.

3. An optical waveguide comprising:
a core layer including a core portion in an elongated shape and a clad portion adjoining the core portion such that the clad portion is surrounding an end portion and side surfaces of the core portion; and
a plurality of clad layers laminated to the core layer such that the core layer is interposed between the clad layers,
wherein the clad layers and the clad portion of the core layer has a concave portion having a processing surface traversing an extension line of a light axis of the core portion at an angle such that the processing surface of the concave portion forms a mirror configured to reflect light passing through one of the clad layers and the clad portion of the core layer toward the end portion of the core portion of the core layer and that the processing surface forming the mirror is formed at a distance in a range of 5 to 250 µm from the end portion of the core portion on the extension line of the light axis of the core portion.

4. The optical waveguide as claimed in claim 3, wherein the core layer comprises a base material which is same as a base material forming the clad layers.

5. The optical waveguide as claimed in claim 3, wherein the clad portion of the core layer is made of a material which is same as a material forming the clad layers.

6. The optical waveguide as claimed in claim 3, wherein the core portion of the core layer comprises a norbornene-based polymer as a main component.

7. The optical waveguide as claimed in claim 1, wherein the core material of the core portion comprises a norbornene-based polymer as a main component, and the clad material of the clad portion comprises a norbornene-based polymer as a main component.

8. The optical waveguide as claimed in claim 1, wherein the processing surface forming the mirror is formed at a distance in a range of 10 to 200 µm from the end portion of the core portion on the extension line of the light axis of the core portion.

9. The optical waveguide as claimed in claim 1, wherein the core portion and the clad portion have a refractive index difference of 0.5% or more.

10. The optical waveguide as claimed in claim 1, further comprising a reflection film formed on the mirror.

11. The optical waveguide as claimed in claim 1, wherein the core material of the core portion comprises a resin material as a main component, and the clad material of the clad portion comprises a resin material as a main component.

12. The optical waveguide as claimed in claim 3, wherein the processing surface forming mirror has a portion corresponding to the core layer and formed at a distance in range of 10 to 200 µm from the end portion of the core portion of the core layer on the extension line of the light axis of the core portion.

13. The optical waveguide as claimed in claim 3, wherein the core portion of the core layer comprises a norbornene-based polymer as a main component, the clad portion of the core layer comprises a norbornene-based polymer as a main component, and each of the clad layers comprises a norbornene-based polymer as a main component.

14. The optical waveguide as claimed in claim 3, wherein the core portion of the core layer comprises a resin material as a main component, the clad portion of the core layer comprises a resin material as a main component, and each of the clad layers comprises a resin material as a main component.

15. The optical waveguide as claimed in claim 3, wherein the core portion and clad portion of the core layer have a refractive index difference of 0.5% or more.

16. The optical waveguide as claimed in claim 3, further comprising a reflection film formed on the mirror.

17. The optical waveguide as claimed in claim 1, wherein the core portion of the core layer comprises a hexyl norbornene-based polymer as a main component, the clad portion of the core layer comprises a hexyl norbornene-based polymer as a main component, and each of the clad layers comprises a hexyl norbornene-based polymer as a main component.

18. The optical waveguide as claimed in claim 3, wherein the core portion of the core layer comprises a hexyl norbornene-based polymer as a main component, the clad portion of the core layer comprises a hexyl norbornene-based polymer as a main component, and each of the clad layers comprises a hexyl norbornene-based polymer as a main component.

19. The optical waveguide as claimed in claim 1, wherein the core portion of the core layer comprises a norbornene-based polymer having a substituent group having an epoxy structure as a main component, the clad portion of the core layer comprises a norbornene-based polymer having a substituent group having an epoxy structure as a main component, and each of the clad layers comprises a norbornene-based polymer having a substituent group having an epoxy structure as a main component.

20. The optical waveguide as claimed in claim 3, wherein the core portion of the core layer comprises a norbornene-based polymer having a substituent group having an epoxy structure as a main component, the clad portion of the core layer comprises a norbornene-based polymer having a substituent group having an epoxy structure as a main component, and each of the clad layers comprises a norbornene-based polymer having a substituent group having an epoxy structure as a main component.

* * * * *